United States Patent
Hosono et al.

(10) Patent No.: US 8,420,236 B2
(45) Date of Patent: Apr. 16, 2013

(54) MAGNETIC SEMICONDUCTOR MATERIAL

(75) Inventors: Hideo Hosono, Kanagawa (JP); Masahiro Hirano, Tokyo (JP); Hidenori Hiramatsu, Kanagawa (JP); Toshio Kamiya, Kanagawa (JP); Hiroshi Yanagi, Tokyo (JP); Eiji Motomitsu, Kanagawa (JP)

(73) Assignee: Japan Science and Technology Agency, Kawagucki-shi (JP)

( * ) Notice: Subject to any disclaimer, the term of this patent is extended or adjusted under 35 U.S.C. 154(b) by 859 days.

(21) Appl. No.: 11/909,020

(22) PCT Filed: Aug. 1, 2006

(86) PCT No.: PCT/JP2006/305405
§ 371 (c)(1),
(2), (4) Date: Sep. 18, 2007

(87) PCT Pub. No.: WO2006/098432
PCT Pub. Date: Sep. 21, 2006

(65) Prior Publication Data
US 2009/0042058 A1    Feb. 12, 2009

(30) Foreign Application Priority Data

Mar. 18, 2005 (JP) .................................. 2005-80572
Dec. 28, 2005 (JP) ................................. 2005-378897

(51) Int. Cl.
*B32B 15/04* (2006.01)

(52) U.S. Cl.
USPC ......... 428/693.1; 257/E31.057; 257/E21.665; 257/421

(58) Field of Classification Search ............... 428/692.1, 428/693.1, 620; 505/125, 170, 171, 191, 505/238, 776, 777, 778, 779, 780, 785; 257/423, 257/E43.001

See application file for complete search history.

(56) References Cited

FOREIGN PATENT DOCUMENTS

| JP | 48-73798 A | 10/1973 |
|----|---|---|
| JP | 60-239398 A | 11/1985 |
| JP | 09-092903 A | 4/1997 |

(Continued)

OTHER PUBLICATIONS

Motomitsu et al. "Bipolar Room Temperature Ferromagnetic Semiconductor LaMnOP." Japanese Journal of Applied Physics 44(2005): L 1344-L 1347.*

(Continued)

*Primary Examiner* — Holly Rickman
*Assistant Examiner* — Lisa Chau
(74) *Attorney, Agent, or Firm* — Westerman, Hattori, Daniels & Adrian, LLP

(57) ABSTRACT

A magnetic semiconductor material contains at least one type of transition metals ($Mn^{2+}$, $Fe^{3+}$, $Ru^{3+}$, $Re^{2+}$, and $Os^{3+}$) having five electrons in the d atomic orbital as a magnetic ion, in which the magnetic semiconductor material exhibits n-type electrical conduction by injection of an electron carrier and p-type electric conduction by injection of a hole carrier. A specific example is a layered oxy-pnictide compound represented by LnMnOPn (wherein Ln is at least one type selected from Y and rare earth elements of La, Ce, Pr, Nd, Sm, Eu, Gd, Tb, Dy, Ho, Er, Tm, Yb, and Lu, and Pn is at least one selected from pnicogen elements of N, P, As, Bi, and Sb). A high-sensitivity magnetic sensor, current sensor, or memory device can be made by using a magnetic pn homojunction structure made of thin films composed of the magnetic semiconductor material.

5 Claims, 4 Drawing Sheets

FOREIGN PATENT DOCUMENTS

| | | | |
|---|---|---|---|
| JP | 2003-008105 A | | 1/2003 |
| JP | 2003-137698 A | | 5/2003 |
| JP | 2003137698 A | * | 5/2003 |
| WO | 03-105162 A1 | | 12/2003 |

OTHER PUBLICATIONS

Nientiedt et al. "Quaternary equiatomic manganese pnictide oxides AMnPO (A= La—Nd, Sm, Gd—Dy), AMnAsO (A=Y, La—Nd, Sm, Gd—Dy, U), and AMnSbO (A= La—Nd, Sm, Gd) with ZrCuSiAs type structure." Zeitschrift fur Naturforschung—Section B Journal of Chemical Sciences 52(1997): 560-564.*

R. Fiederling et al.; "Injection and Detection of a spin-polarized current in a light-emitting diode"; Letters to Nature, vol. 402, pp. 787-789, Dec. 16, 1999.

Y. Ohno et al.; "Electrical spin injection in a ferromagnetic semiconductor heterostructure", Letters to Nature, vol. 402, pp. 790-792, Dec. 16, 1999.

M. Johnson et al.; "Interfacial Charge-Spin Coupling: Injection and Detection of Spin Magnetization in Metals", The American Physical Society, vol. 55, No. 17, pp. 1790-1793, Oct. 21, 1985.

C. P. Wen et al.; "Device Application Feasibility of Single-Crystal CdCr2Se4, a Ferromagnetic Semiconducting Spinel": IEEE Transactions of Magnetics, vol. MAG-4, No. 4, pp. 702-704, Dec. 1968.

E. Motomitsu et al.; "Bipolar Room Temperature Ferromagnetic Semiconductor LaMnOP", Japanese Journal of Applied Physics, vol. 44, No. 44, pp. L1344-L-1347, 2005.

International Search Report of PCT/JP2006/305405, date of mailing Apr. 18, 2006.

* cited by examiner

MAGNETIC SEMICONDUCTOR MATERIAL

TECHNICAL FIELD

The present invention relates to a magnetic semiconductor material, which is a single compound capable of exhibiting two different conductivity types, i.e., n-type and p-type. In particular, it relates to a magnetic semiconductor material including an oxy-pnictide layered compound.

BACKGROUND ART

A magnetic semiconductor compound is a unique compound having both semiconducting electrical property and magnetic property. Because the magnetic semiconductor compound exhibits a large magnetoresistive effect near the magnetic transition temperature (Curie temperature Tc or Neel temperature $T_N$), its application to magnetic sensors and the like are expected. However, most magnetic semiconductor compounds discovered so far exhibit only one conductivity type, i.e., either n-type or p-type, and no magnetic semiconductor compound that can exhibit both conductivity types, i.e., n-type and p-type, has been discovered to date except for $CdCr_2Se_4$ (non-patent document 1).

In $CdCr_2Se_4$, the $3d^6$ electron of a $Cr^{3+}$ ion is accountable for magnetic property and 4p of Se and the 4s electron of Cd are the hole and the electron accountable for the conduction. Thus, there is little interaction between the magnetic property and the electrical conduction. Furthermore, $Cr^{3+}$ having a $3d^6$ electron configuration disadvantageously exhibits a magnetic moment smaller than and a Curie temperature (150 K) lower than those of the $3d^5$ electron configuration of the $Mn^{2+}$ ion and the $Fe^{3+}$ ion. Due to these drawbacks, a pn homojunction magnetic device suitable for practical use has not been available.

Another approach of making various magnetic devices is by using a pn junction structure of a magnetic semiconductor and a nonmagnetic semiconductor (nonpatent documents 2 to 4). These devices are named spin bipolar devices but are not put to practical use because formation of high-quality pn junction structures is difficult and the magnetic transition temperature of the magnetic semiconductor is lower than room temperature.

Nonpatent document 1: P. W. Cheng et al. IEEE, Trans. Magn. 4, 702-704 (1968)
Nonpatent document 2: M. Johnsonn et al. Phys. Rev. Lett. 55, 1790 (1985)
Nonpatent document 3: Fiederling et al. Nature 402, 787 (1999)
Nonpatent document 4: Ohno et al. Nature 402, 790 (1999)

DISCLOSURE OF INVENTION

Problems to be Solved by Invention

Although the magnetic semiconductor is expected to be applied to magnetic sensors for possession of both electrically conductive property and magnetic property, to Faraday devices for its optical transparency, to magnetic transistors for its controllability of magnetic property by electrical current (namely, changes in magnetic transition temperature and changes in magnitude of magnetic moment), and the like, most of the magnetic semiconductors known to date exhibit only one conductivity type. Therefore, a pn homojunction structure that can fully utilize the advantages of the magnetic semiconductors cannot be formed, and the application range of the bipolar spin electronics has been limited. Although magnetic semiconductors include "magnetic semiconductors in a strict sense" containing magnetic ions as the constituent ions of the compounds and "dilute magnetic semiconductors" in which magnetic ions are contained as additive ions in nonmagnetic semiconductors such as GaAs, "magnetic semiconductor" related to the present invention is the "magnetic semiconductors in a strict sense" and does not include "dilute magnetic semiconductors".

In other words, an object of the present invention is to develop a novel magnetic semiconductor material that provides a single compound that can exhibit both n- and p-conductivity types, magnetic property of which can be controlled by introducing an electrical conduction carrier into the compound, in particular, magnetic transition temperature of which can be controlled to room temperature or higher.

Means for Solving the Problem

The present inventors have found that compounds that contain $Mn^{2+}$ and $Fe^{3+}$ ions having the $d^5$ electron configuration as primary magnetic ions have a potential of exhibiting high magnetic transition temperature and bipolar conduction. As a result of energetic investigations of the corresponding compounds, the inventors have found that LnMnOPn (Ln is selected from Y and rare earth elements of La, Ce, Pr, Nd, Sm, Eu, Gd, Tb, Dy, Ho, Er, Tm, Yb, and Lu and Pn is selected from pnicogen elements of N, P, As, Sb, and Bi), which is an oxy-pnictide layered compound containing a $Mn^{2+}$ ion, is a magnetic insulator having a magnetic transition point equal to or higher than room temperature when the compound has a stoichiometric composition and that a compound represented by $LnMnO_{1\pm x}Pn_{1\pm y}$ (0<x<0.1, 0<x<0.1), which is the compound LnMnOPn but with the O ion chemical equivalent ratio and/or the Pn ion chemical equivalent ratio deviating from the stoichiometric composition by less than 10 atomic percent, exhibits electrical conductivity. The inventors have also found that a compound LnMnOPn with the O ion chemical equivalent ratio and/or the Pn ion chemical equivalent ratio higher than the stoichiometric composition exhibits a p-type conduction and a compound with the O ion chemical equivalent ratio and/or the Pn ion chemical equivalent ratio lower than the stoichiometric composition exhibits an n-type conduction.

An oxy-pnictide layered compound containing a divalent manganese ion was first synthesized by a group of A. T. Nientiedt in 1996, and the crystal structure thereof was clarified (A. T. Nientiedt et al., Z Kristallogr. Suppl. 11, 101 (1996), A. T. Nientiedt et al., Z. Naturforsch. 52b, 560-564 (1997)). However, its semiconducting property and magnetic property remain unknown.

It has been found that among magnetic compounds containing, as the primary magnetic ions, $Mn^{2+}$, $Fe^{3+}$, and the like having the $d^5$ electron configuration in which exactly a half of the d-electron orbit is filled with electrons, the compounds in which the $3d^5$ state forms an energy band edge exhibits a higher magnetic transition temperature and bipolar electrical conductivity and is therefore useful for developing magnetic devices.

The reasons why the bipolar conduction is possible will now be described with reference to the schematic energy band structure of LnMnOP shown in FIG. 1. According to the electron configuration of the LnMnOP compound, the Hund's electron configuration where the spin moment of $Mn3d^5$ is maximum (the state in which spins of all 5 electrons are parallel) forms an up-spin band and the upper edge of the valence band. The 2p orbital of the P ion forms a band (P2p band) located at the lower part of the valence band.

A Mn3d$^5$ down-spin band formed by a spin state antiparallel to the spin in the Hund's state forms the lower edge of the conduction band. The 4s orbital of the Mn ion forms a band (Mn4s band) located in the upper part of the conduction band. The difference in energy between the upper edge of the valence band and the lower edges of the conduction band gives the forbidden band shown by a double-headed arrow in FIG. 1. A stoichiometric compound free of impurities has no electrons in the conduction band. That is, a compound having such an energy band structure exhibits semiconducting electrical property and is a magnetic material.

When a hole carrier is injected into the magnetic compound having the energy band structure shown in FIG. 1, holes are injected in the valence band and travel inside the valence band to yield a p-type conduction. This state in which holes are injected can also be considered as a change of part of the Mn$^{2+}$ ion to Mn$^{3+}$. According to this view, migration of the holes is equivalent to a shift of the position of Mn$^{3+}$ in the crystal.

In contrast, when an electron carrier is injected, the electrons are located in the conduction band and travel inside the conduction band, thereby yielding an n-type conduction. This state can also be considered as a change of position of Mn$^{1+}$ in the crystal by generation of Mn$^{1+}$ by electron injection. That is, the present inventors have found the mechanism which enables pn conduction control by withdrawal and donation of electrons in a magnetic compound in which a d$^5$ electron configuration forms the valence band and the conduction band.

The present inventors have found that electron withdrawal and donation can be achieved by shifting the chemical equivalent ratios of the anions (O and P) from the stoichiometric composition and doping with anions or cations with different ionic valency from that of the constituent ions of the compound. The present inventors have also found that the d$^5$ electron configuration has the maximum magnetic moment among the transition metal ions and can yield high magnetic transition temperature, and that the d5 electron configuration can increase the energy width of the forbidden band and decrease the wavelength of the light transmitting therethrough.

That is, the present invention provides: (1) A magnetic semiconductor material containing at least one type of transition metals (Mn$^{2+}$, Fe$^{3+}$, Ru$^{3+}$, Re$^{2+}$, and Os$^{3+}$) having five electrons in the d atomic orbital as a magnetic ion constituting the compound, wherein the magnetic semiconductor material is a single material that exhibits n-type electrical conduction by injection of an electron carrier and p-type electric conduction by injection of a hole carrier such that the compound exhibits bipolar conduction.

For the purpose of the description, "magnetic compound" is defined as a compound in which magnetic moments of magnetic ions are aligned at a particular temperature (magnetic transition temperature) or less. Magnetic compounds include ferromagnetic compounds and antiferromagnetic compounds. Ferromagnetic compounds are defined as compounds having spontaneous magnetic moment. Ferromagnetic compounds include "ferromagnetic compounds in a strict sense (ferromagnetic material) in which magnetic moments of individual ions are aligned in parallel, "ferrimagnetic compounds" in which two types of magnetic ions with different magnetic moments are contained, and the magnetic moments are parallel between the same magnetic ions but are antiparallel between different magnetic ions, and "mildly ferromagnetic compounds" (canted antiferromagnetic compounds)" in which the magnetic moments of the magnetic ions are basically oriented antiparallel to each other but there remain some deviation from the antiparallel state. Antiferromagnetic compounds are compounds that have magnetic moments of the magnetic ions orient antiparallel to each other and exhibit no spontaneous magnetic moment at a temperature equal to or lower than the magnetic transition temperature.

The present invention also provides: (2) The magnetic semiconductor material described in (1) above represented by a chemical formula, LnMnOPn (wherein Ln is at least one type selected from Y and rare earth elements of La, Ce, Pr, Nd, Sm, Eu, Gd, Tb, Dy, Ho, Er, Tm, Yb, and Lu, and Pn is at least one selected from pnicogen elements of N, P, As, Bi, and Sb).

The present invention also provides: (3) the magnetic semiconductor material described in (2) above, in which the n-type electrical conduction is yielded by decreasing the chemical equivalent ratios of the oxygen ion (O$^{2-}$) and/or Pn ion (Pn$^{3-}$) from the stoichiometric composition so that the compound is represented by LnMnO$_{1-x}$Pn$_{1-y}$ (wherein $0<x<0.1$ and $0<y<0.1$) and the p-type electrical conduction is yielded by increasing the chemical equivalent ratios of the oxygen ion (O$^{2-}$) and/or Pn ion (Pn$^{3-}$) from the stoichiometric composition so that the compound is represented by LnMnO$_{1+x}$Pn$_{1+y}$ (wherein $0<x<0.1$ and $0<y<0.1$).

The present inventors have further found that the p-type conductivity can be increased by partly substituting the Ln ion of the magnetic compound described above with a divalent cation such as Ca$^{2+}$ ion or the like.

Furthermore, the present inventors have found that n-type conduction can be yielded from the above-described ferromagnetic compound by partly substituting the Ln ion with a tetravalent cation such as a Zr$^{4+}$ ion.

That is, the present invention provides: (4) the magnetic semiconductor material described in (2) above, in which the p-type conduction is yielded by doping the Ln$^{3+}$ ion site with a divalent metal ion (Mg$^{2+}$, Ca$^{2+}$, Sr$^{2+}$, or Ba$^{2+}$) and the n-type conduction is yielded by doping the Ln$^{3+}$ ion site with a tetravalent metal ion (Ti$^{4+}$, Zr$^{4+}$, Hf$^{4+}$, Si$^{4+}$, Ge$^{4+}$, Sn$^{4+}$, or Pb$^{4+}$).

The magnetic semiconductor material described above can shaped into a thin film or the like and be used as a magnetic material. By joining a thin film of a p-type magnetic semiconductor material and a thin film of an n-type magnetic semiconductor material, a magnetic pn homojunction structure can be formed. As the usage of magnetic devices incorporating such a magnetic pn homojunction structure, devices for detecting external magnetic fields, devices for detecting electric current, and memory devices that can read, write, and retain information are particularly preferable, but the usage is not limited to these.

ADVANTAGES

The present invention provides a novel magnetic semiconductor material capable of exhibiting n- and p-conductivity types, whose electrical conductivity can be controlled and magnetic transition temperature can be controlled to room temperature or higher.

BEST MODE FOR CARRYING OUT THE INVENTION

A magnetic semiconductor material including a d$^5$ electron configuration has a high magnetic transition temperature and exhibits bipolar electrical conduction, and is thereby capable of forming a magnetic pn homojunction structure. Examples of the ion having the d$^5$ electron configuration include Mn$^{2+}$ and Fe$^{3+}$ for the 3d orbital, Ru$^{3+}$ for the 4d orbital, and Re$^{2+}$ and $Os^{3+}$ for the 5d orbital. Among these magnetic ions, compounds containing $Mn^{2+}$ and $Fe^{3+}$, which have small atomic numbers and are abundant in the earth's crust, are preferred.

Examples of the binary compound containing $Mn^{2+}$ or $Fe^{3+}$ include MnO, $Fe_2O_3$, MnS, $Fe_2S_3$, $Mn_3P_2$, and FeP. These compounds have a magnetic transition temperature of room temperature or less, and many of these compounds are in a paramagnetic state in which spin moments are disoriented, and exhibit metal conduction. None of the compounds is a magnetic material having a magnetic transition point of room temperature or higher and a semiconductor having bipolar electrical conduction, and thus satisfy the conditions required for the novel compound. Moreover, use of a plurality of types of anions alone cannot significantly change the electrical and magnetic properties.

In this regard, the compound that satisfies the requirements must contain at least two types of metal ions. Among such compounds, layered compounds allow independent control of each layer, readily exhibits semiconducting properties due to its two-dimensional structure, and has a high magnetic transition temperature due to large magnetic interaction in the layers.

The present inventors have found that LaMnOP having a structure in which a $(MnP)^+$ layer and a $(LaO)^-$ layer are stacked exhibits semiconducting electrical properties and is a magnetic material having a magnetic transition temperature near room temperature (about 300 K). Compounds produced by entirely or partly substituting P with a pnictide ion such as As or Sb ions, and the La ion with another rare earth ion also show similar magnetic and electrical properties.

The best mode of enforcing the present invention is described below by taking LaMnOP as an example. A mixed powder of LaP and MnO was sintered in an inert gas atmosphere by retaining 1100° C. for about 10 hours to prepare a LaMnOP powder. The sintered powder was confirmed to have a LaMnOP phase containing less than 1 percent by mass of an impurity phase on the basis of a powder X-ray diffraction spectrogram shown in FIG. 2. The crystal structure was of a ZrCuSiAs-type and in the space group P4/nmm.

A thin film specimen was produced by preparing a target from this LaMnOP sintered powder and depositing the material on a single-crystal substrate or a glass substrate by a vapor-phase deposition technique. It is simple to employ a laser deposition technique (PLD) as the vapor-phase deposition technique, while a sputtering technique is advantageous when large-sized substrates suitable for mass production are used. However, the technique is not limited to these two techniques. The single-crystal substrate is preferably MgO or $SrTiO_3$, but it is not limited to these.

When LaP and MnO are mixed at a chemical equivalent ratio and sintered in vacuum, P and/or O with high vapor pressure evaporate to give a sintered compound represented by $LnMnO_{1-x}Pn_{1-y}$ (wherein $0<x<0.1$ and $0<y<0.1$), in which the P content and/or the O content is smaller than the chemical equivalent. This compound exhibits an n-type conduction.

When LaP and MnO are mixed at a chemical equivalent ratio and $LaP_2$ or $MnO_2$ is further added to the resulting mixture, a compound represented by $LnMnO_{1+x}Pn_{1+y}$ (wherein $0<x<0.1$ and $0<y<0.1$), in which the P content and/or the O content is larger than the chemical equivalent is produced, and this compound exhibits a p-type conduction. In other words, an electron carrier and a hole carrier can be introduced by controlling the deviation of the anions from the stoichiometric composition. Note that whether the compound is of n-type or p-type is determined by the sign of the Seebeck coefficient.

The magnetization intensity of the LaMnOP of a p-conductivity type represented by $LnMnO_{1-x}Pn_{1-y}$ (wherein $0<x<0.1$ and $0<y<0.1$) was measured in a range of 4 K to 400 K with a sample oscillating magnetometer. It was found that LaMnOP was a magnetic material having a transition temperature from the paramagnetic phase to the magnetic phase of about 300 K and exhibited a small spontaneous magnetic moment of less than 0.3 µB per $Mn^{2+}$ ion (µB: Bohr magneton).

As the temperature was gradually decreased, the spontaneous magnetic moment vanished near 50 K. This shows that LaMnOP basically has an antiferromagnetic spin arrangement. The cause of generation of the spontaneous magnetic moment is presumably that the spin arrangement is a mildly ferromagnetic arrangement inclined at less than 1° from the complete antiparallel state or that MnP showing ferromagnetic property is incorporated as fine particles. In other words, LaMnOP exhibits an antiferromagnetic or mildly ferromagnetic spin arrangement at the transition temperature or lower. The electrical properties, such as conductivity type and resistance, of LaMnOP are independent of the cause of generation of the spontaneous magnetic moment.

By adding Ca to LaMnOP, the p-type electrical conductivity increases significantly. At a Ca concentration of 10 at. % relative to La, the magnetic transition temperature increases by about 10 degrees. Moreover, by adding Zr to LaMnOP, the n-type electrical conductivity increases significantly. When the compound is of an n-type, the magnetic transition temperature decreases with an increase in electrical conductivity.

The logarithm of electrical conductivity (S/cm) and Seebeck coefficient (mV/K) versus additive impurity concentration are shown in FIG. 3. That is, the Seebeck coefficient of LaMnOP with $Ca^{2+}$ is positive, which shows this compound is a p-type conductor. The graph also shows that the p-type conductivity increases with the $Ca^{2+}$ concentration, which shows that holes are injected by addition of $Ca^{2+}$.

In contrast, the Seebeck coefficient of the compound with $Zr^{4+}$ is negative, which shows this compound is an n-type conductor. The graph also shows that the n-type conductivity increases with $Zr^{4+}$ concentration, which shows that electrons are injected by addition of $Zr^{4+}$.

A p-type LaMnOP thin film doped with 10 at. % of $Ca^{2+}$ is formed on a MgO single-crystal substrate by a PLD technique, and an n-type LaMnOP thin film doped with 1 at. % of $Zr^{4+}$ is deposited on the p-type LaMnOP thin film to form a pn homojunction.

A magnetic pn homojunction structure can be produced by joining the n-type LnMnOPn thin film and the p-type LnMnOPn thin film formed as above. This structure shows the same rectification property as regular semiconductor pn junctions is exhibited when an electrode is installed on each of the p-type thin film and the n-type thin film and an electrical field is applied between the two electrodes.

Example 1

Example 1-1

Synthesis of LaMnOP:Ca and Magnetic and Electrical Properties

To a mixture powder of LaP and MnO at a chemical equivalent ratio, about 1 at. % of $LaP_2$ was added such that the P was in excess of the stoichiometric composition. Furthermore, metallic Ca was added in an amount of 0 at. % (Sample 1), 3 at. % (Sample 2), and 10 at. % (Sample 3) relative to lanthanum, and the resulting mixture was retained at 1100° C. for 10 hours in an argon gas atmosphere and gradually cooled to obtain a gray powder sample. FIG. 2 showing the X-ray diffraction spectrum of each resulting powder demonstrates that all powder samples were LaMnOP compounds having an impurity content of less than 1 percent by mass.

The dependency of the magnetic moment (M) on magnetic field (H=0 to 7 T) and temperature (T=4 K to 400 K) of each of Samples 1, 2, and 3 were measured with a sample oscillating magnetometer. At a temperature lower than the magnetic transition temperature, M rapidly increases by application of H and subsequently linearly and moderately increases in proportion to H. This linear portion was extrapolated for H=0 to determine apparent spontaneous magnetic moment (Ms). All of Samples 1, 2, and 3 had Ms of less than 0.3 μB per $Mn^{2+}$ ion. The cause of generation of the spontaneous magnetic moment is either the mildly ferromagnetic spin arrangement of the LaMnOP compound or the ferromagnetic property of the trace amounts of MnAs contained therein.

FIG. 4 shows changes in electrical resistance ρ and magnetoresistive effect (MR) of Sample 3 versus temperature with or without application of a magnetic field (1.5 T). Here, $MR=\rho[(H=1.5\ T)-\rho(H=0)]/\rho(H=1.5\ T)\times 100$. A large magnetoresistive effect reaching 70% was observed near 50 K. Moreover, a magnetoresistive effect of about 10% was observed near room temperature, which showed that the sample can be used as a material for a magnetic sensor or magnetic random access memory (MRAM) element operational at room temperature.

Example 1-2

Synthesis of LaMnOP:Zr and Electrical and Magnetic Properties

To a mixture powder of LaP and MnO at a chemical equivalent ratio, metallic Zr was added in an amount of 1 at. % (Sample 4), 3 at. % (Sample 5), and 5 at. % (Sample 6) relative to lanthanum, and the resulting mixture was retained at 1200° C. for 12 hours in an argon gas atmosphere and gradually cooled to obtain a gray powder sample. An X-ray diffraction spectrum of the resulting powder demonstrated that all powder samples were LaMnOP compounds having an impurity content of less than 1 percent by mass.

The dependency of magnetic moment (M) on magnetic field (H=0 to 7 T) and temperature (T=4 K to 400 K) of each of Samples 4, 5, and 6 was measured with a sample oscillating magnetometer. Although Ms appeared at low temperature for Samples 4 and 5, Ms did not appear before 0 K for Sample 6. The value of Ms was less than 0.3 μB per $Mn^{2+}$ ion. When the reciprocal of the magnetic susceptibility is plotted versus absolute temperature $((1/\chi)-T)$, a linear relationship is observed, and the Curie-Weiss law is established. For Samples 4 and 5, the temperature at which the extended straight line intersects the abscissa is negative, which shows that the magnetic interaction of these samples is antiferromagnetic. For Sample 6, the extended straight line intersects the abscissa at zero degrees, which shows that the sample is a paramagnetic material having a magnetic transition temperature of zero.

The Seebeck voltage and four-probe electrical resistance of Samples 4, 5, and 6 were measured. The Seebeck coefficient was negative in all Samples 4, 5, and 6, which shows that Samples 4, 5, and 6 were n-type conductors. The electrical resistance of Samples 4, 5, and 6 did not substantially change by application of a magnetic field, and substantially no magnetoresistive effect was observed. The dependency of the electrical resistance and the magnetoresistive effect of Sample 5 on temperature is shown in FIG. 4.

Example 2

Synthesis of LaMnOAs:Mg or Zr and Electrical and Magnetic Properties

A powder in which LaAs and MnO were mixed at a chemical equivalent ratio was retained at 1100° C. for 10 hours in an argon gas atmosphere and gradually cooled to obtain a gray powder sample. A powder X-ray spectrum of the resulting sample showed that the resulting powder was a layered LaMnOAs compound phase having a ZrCuSiAs-type crystal structure in the space group P4/nmm, and that the impurity phase contained therein was less than 1 percent by mass.

To a mixture powder of LaAs and MnO at a chemical equivalent ratio, metallic Mg was added in an amount of 1 at. % (Sample 7), 3 at. % (Sample 8), and 5 at. % (Sample 9) relative to lanthanum, and the resulting mixture was retained at 1100° C. for 10 hours in a reducing atmosphere containing hydrogen gas and gradually cooled to obtain a gray powder sample. A powder X-ray spectrum of the resulting sample showed that the resulting powder was a layered LaMnOAs compound phase having a ZrCuSiAs-type crystal structure in the space group P4/nmm, and that the impurity phase contained therein was less than 1 percent by mass.

To a mixture powder of LaAs and MnO at a chemical equivalent ratio, metallic Zr was added in an amount of 1 at. % (Sample 10), 3 at. % (Sample 11), and 5 at. % (Sample 12) relative to lanthanum, and the resulting mixture was retained at 1100° C. for 10 hours in a reducing atmosphere containing hydrogen gas and gradually cooled to obtain a gray powder sample. A powder X-ray spectrum of the resulting sample showed that the resulting powder was a layered LaMnOAs compound phase having a ZrCuSiAs-type crystal structure in the space group P4/nmm, and that the impurity phase contained therein was less than 1 percent by mass.

The Seebeck coefficient (S) of Samples 7, 8, 9, 10, 11, and 12 was measured. The value of S was negative for Samples 7, 8, and 9, which showed that Samples 7, 8, and 9 were p-type conductors. The value of S was positive for Samples 10, 11, and 12, which showed that Samples 10, 11, and 12 were n-type conductors.

The electrical conductivity of Samples 7, 8, 9, 10, 11, and 12 was measured by a four-probe method. The electrical conductivity of Sample 7 at room temperature was about $10^{-3}$ S/cm. The electrical conductivity increased with the amount of Mg added. The electrical conductivity of Sample 8 containing 3 at. % of Mg was $10^{-2}$ S/cm at room temperature. The electrical conductivity of Sample 10 was about $10^{-2}$ S/cm. The electrical conductivity increased with the amount of Zr added. The electrical conductivity of Sample 11 containing 3 at. % of Zr was $10^{-1}$ S/cm, and the electrical conductivity of Sample 12 containing 5 at. % of Zr was 50 S/cm.

Changes in electrical resistance and Seebeck coefficient plotted versus Zr and Mg at room temperature are shown in FIG. 5. FIG. 5 demonstrated that addition of Mg or Zr introduced a p-type or n-type carrier and increased the electrical conductivity.

Changes in electrical resistance of Samples 7, 8, and 9 against temperature with or without application of a magnetic field (2 T) are shown in FIG. 6. Changes in electrical resistance of samples 10, 11, and 12 against temperature with or without application of a magnetic field (2 T) are shown in FIG. 7. The samples that contain Mg and exhibit p-type conduction (Samples 7, 8, and 9) showed negative magnetic resistance, and the samples that contain Zr and exhibit n-type conduction (Samples 10, 11, and 12) showed positive magnetic resistance.

The dependency of magnetic moment (M) on magnetic field (H=0 to 7 T) and the temperature (T=4 K to 400 K) of each of Samples 7, 8, 9, 10, 11, and 12 was measured with a sample oscillating magnetometer. The spontaneous magnetic moment of Samples 7, 8, 9, 10, 11, and 12, was as small as less than 0.3 µB per $Mn^{2+}$ ion. The reason for this is either than the LaMnOAs compound has a mildly ferromagnetic spin arrangement or that trace amounts of MnAs having ferromagnetic property is contained.

Example 3

Synthesis of LaMnOSb:M and Electrical and Magnetic Properties

To a mixture powder of LaSb and MnO at a chemical equivalent ratio, metallic Mg was added in an amount of 3 at. % (Sample 12), 5 at. % (Sample 13), and 7 at. % (Sample 14) relative to lanthanum, and the resulting mixture was retained at 1100° C. for 10 hours in a reducing atmosphere containing hydrogen gas and gradually cooled to obtain a gray powder sample. A powder X-ray spectrum of the resulting sample showed that the resulting powder was a layered LaMnOSb compound phase having a ZrCuSiAs-type crystal structure in the space group P4/nmm, and that the impurity phase contained therein was less than 1 percent by mass.

The electrical conductivity of Samples 12, 13, and 14 was measured by a four-probe method. FIG. 8 shows changes in electrical resistance of Sample 13 versus temperature under application of no magnetic field and under application of 1.5 T of a magnetic field. The electrical resistance at room temperature under application of no magnetic field was about 0.4 Ωcm and increased with the Mg concentration. A magnetoresistive effect of about −10% was observed near room temperature.

The dependency of magnetic moment (M) on magnetic field (H=0 to 7 T) and temperature (T=4 K to 400 K) of each of Samples 12, 13, and 14 was measured with a sample oscillating magnetometer. The spontaneous magnetic moment observed was as small as less than 0.3 µB per $Mn^{2+}$ ion at a temperature lower than the magnetic transition temperature. The reason for this is either than the LaMnOAs compound has a mildly ferromagnetic spin arrangement or that trace amounts of MnAs having ferromagnetic property is contained.

Example 4

Formation of LaMnOP pn Homojunction Structure

Sample 3 obtained in Example 1-1 was pressed to form a target. A LaMnOP:Ca film was deposited on a MgO substrate at 800° C. by a pulsed laser deposition technique (PLD) using the target. The resulting thin film was discharged from the deposition chamber, and the X-ray analysis spectrum was measured. The results showed that the resulting thin film was a LaMnOP single-phase polycrystalline film in which the c axis was oriented in a direction perpendicular to the substrate. The light-transmission spectrum of the LaMnOP thin film deposited on the MgO substrate is shown in FIG. 9. The semiconductor energy width was about 1 eV, and the light transmittance was 50% or more with respect to the long wavelength-light exceeding 1.3 µm, which showed that the film was transparent. It was confirmed from the measurement of the Seebeck coefficient that the film exhibits p-type electrical conduction.

A LaMnOP:Ca film was deposited on a MgO substrate under the same conditions, and then a LaMnOP:Zr film was deposited on the LaMnOP:Ca film under the same conditions but with a target prepared from Sample 6 obtained in Example 1-2. The deposited film was discharged from the deposition chamber, gold electrodes were formed by vapor deposition, and the voltage-current characteristic (I-V characteristic) was measured with an electrode prober at room temperature. The I-V characteristic showed a rapid increase in current when the voltage was applied in the forward direction. In contrast, substantially no electrical current flowed under application of −10 V when the voltage was applied in the backward direction. That is, distinctive rectification property was observed, thereby demonstrating the formation of a pn homojunction structure.

The above-described examples showed that LnMnOPh was a bipolar magnetic semiconductor that can exhibit both p- and n-conductivity type and that a magnetic pn semiconductor homojunction could be formed due to this feature. Moreover, due to appearance of the spontaneous magnetic moment, magnetoresistive effects were observed. Although the exact cause of the appearance of the spontaneous magnetic moment is not clear, the magnetoresistive effect can be utilized to configure magnetic sensors and magnetic memory elements.

INDUSTRIAL APPLICABILITY

According to the present invention, a highly sensitive magnetic sensors, current sensors, and memory devices can be formed utilizing the magnetoresistive effect of a novel magnetic semiconductor material capable of exhibiting n-type electrical conduction by injection of an electron carrier and p-type electrical conduction by injection of a hole carrier and utilizing a magnetic pn homojunction structure composed of such a compound.

Figure 1:
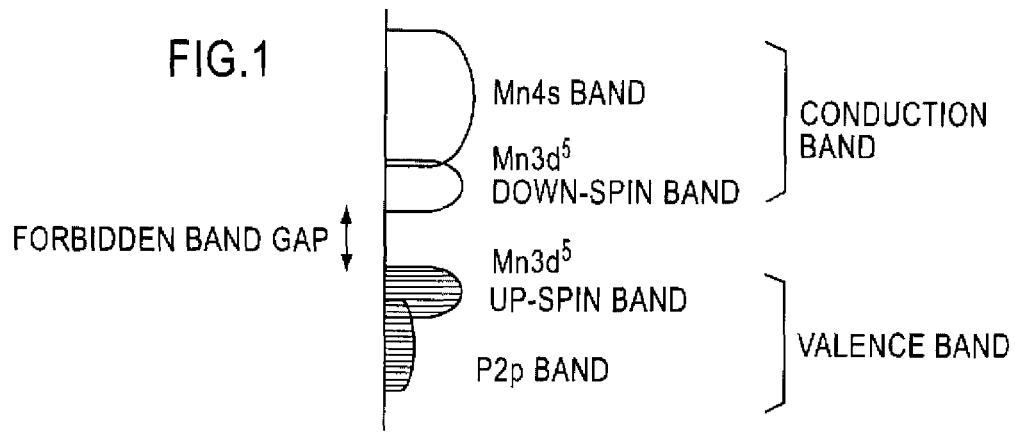
FIG. 1 A diagram schematically showing the energy band structure of LaMnOP.
Figure 2:
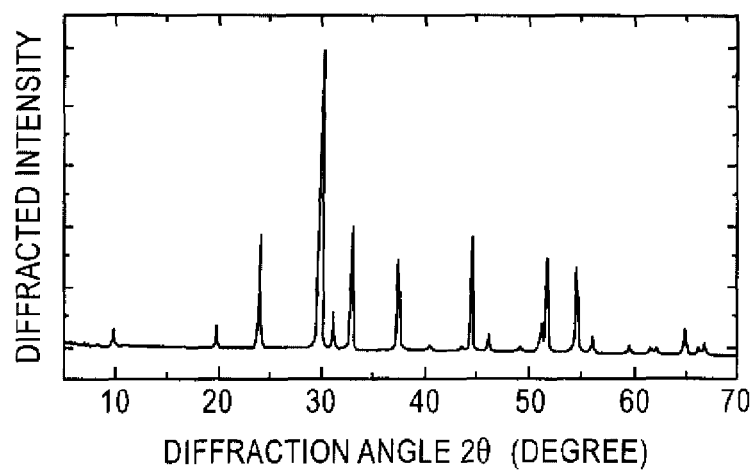
FIG. 2 A graph showing a powder X-ray diffraction pattern of LaMnOP.
Figure 3:
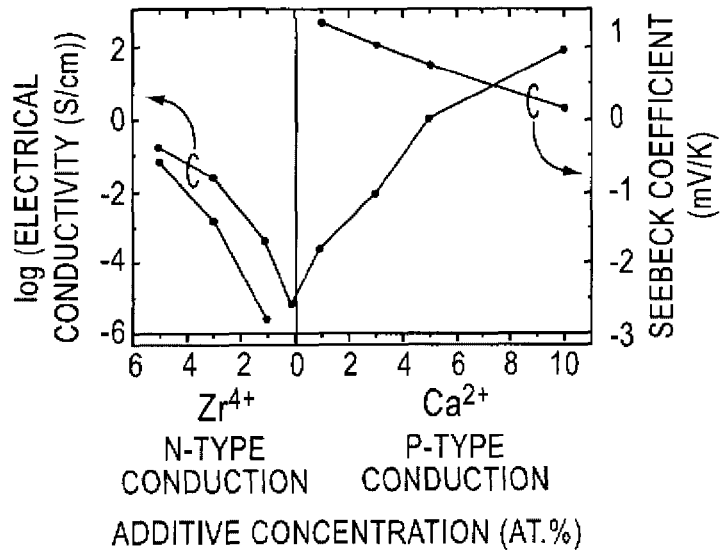
FIG. 3 A graph showing dependency of electrical conductivity (S/cm) and Seebeck coefficient of LaMnOP on the Ca and Zr concentration (at. %).
Figure 4:
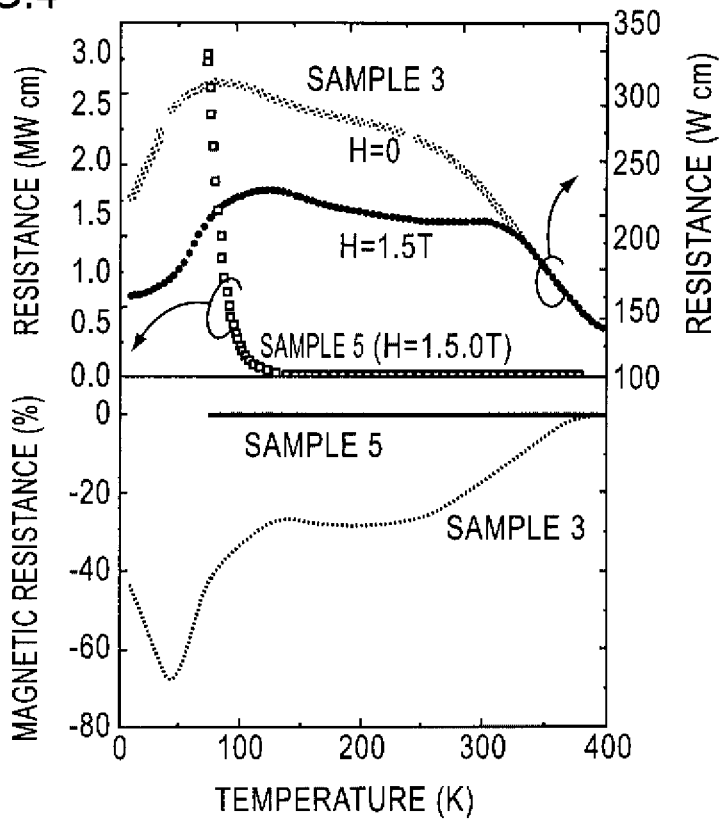
FIG. 4 Graphs showing the dependency of electrical resistance and magnetoresistive effect of Sample 3 (LaMnOP:Ca (10 at. %)) and Sample 5 (LaMnOP:Zr (3 at. %)) on temperature.
Figure 5:
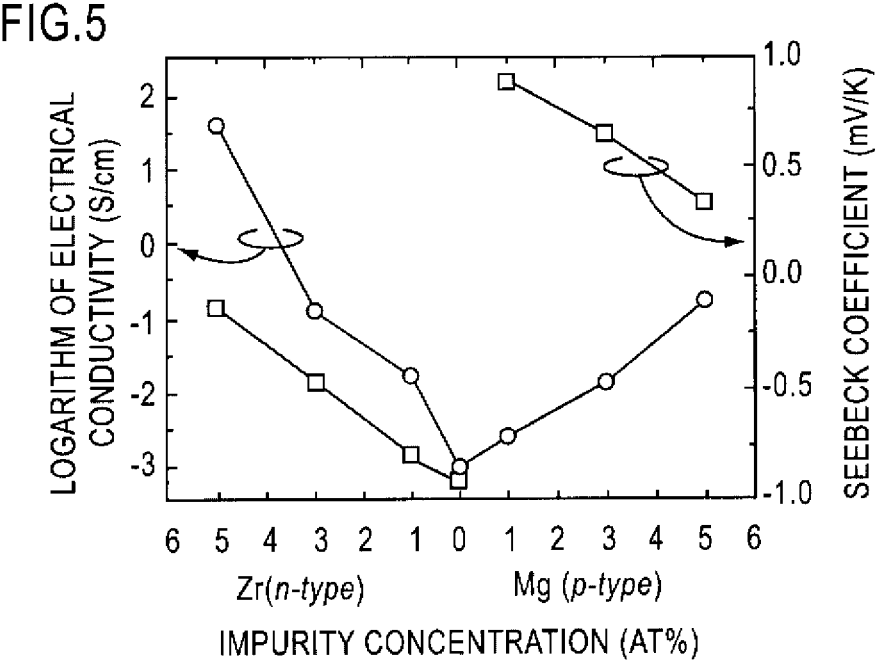
FIG. 5 A graph showing the dependency of electrical conductivity and Seebeck coefficient of LaMnOAs containing Mg and Zr on the Mg and Zr concentrations at room temperature.
Figure 6:
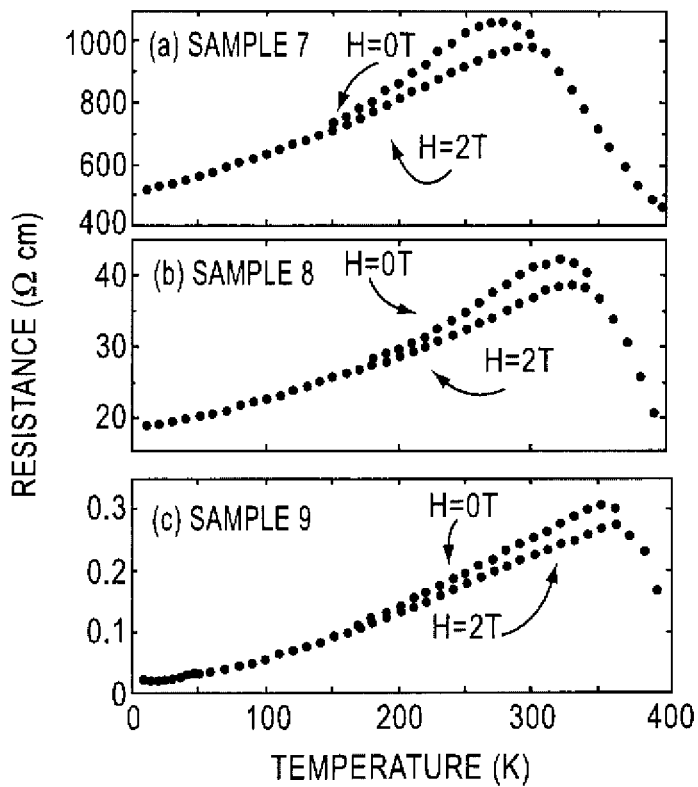
FIG. 6 Graphs showing changes in electrical resistance of LaMnOAs (Samples 7, 8, and 9) containing Mg without application of a magnetic field (H=0 T) and with application of a magnetic field (H=2 T) against temperature.
Figure 7:
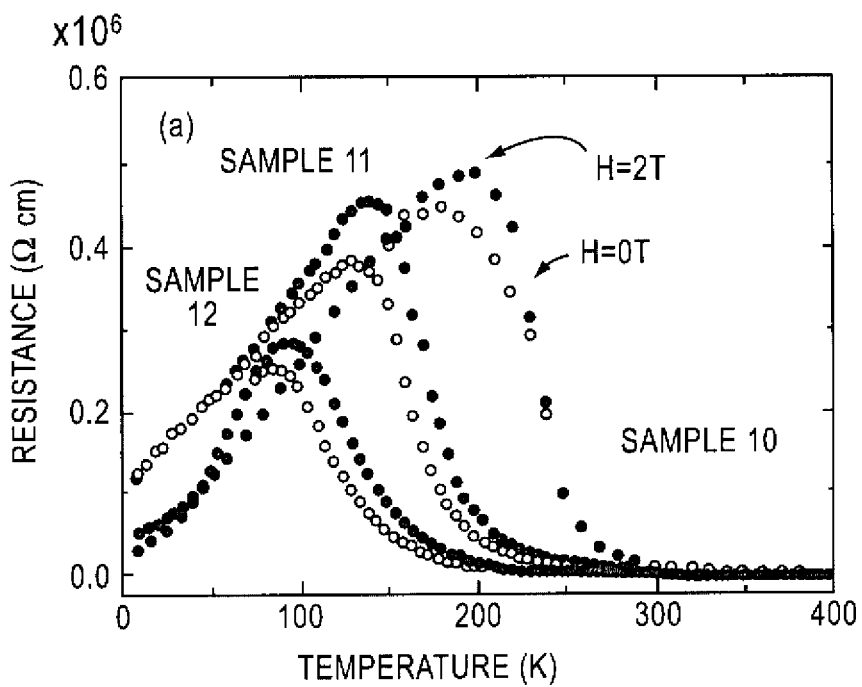
FIG. 7 Graphs showing changes in electrical resistance ratio (magnetoresistive effect) of LaMnOAs (Samples 10, 11, and 12) containing Zr without application of a magnetic field (H=0 T) and with application of a magnetic field (H=2 T) against temperature.
Figure 8:
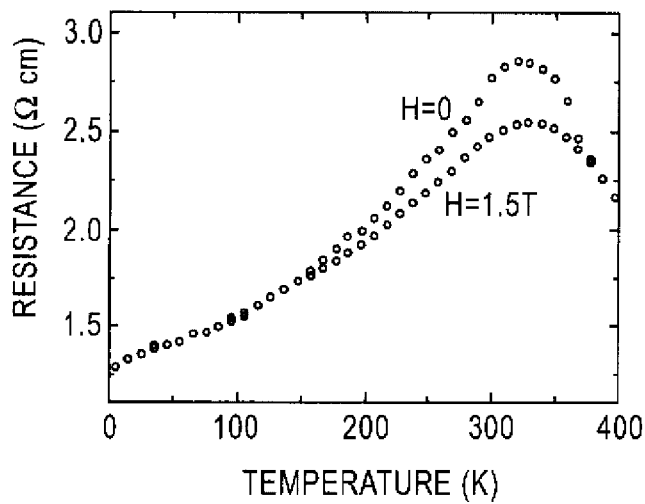
FIG. 8 A graph showing changes in electrical resistance of LaMnOSb with application of a magnetic field (H=0 T) and with application of a magnetic field (H=1.5 T) against temperature.
Figure 9:
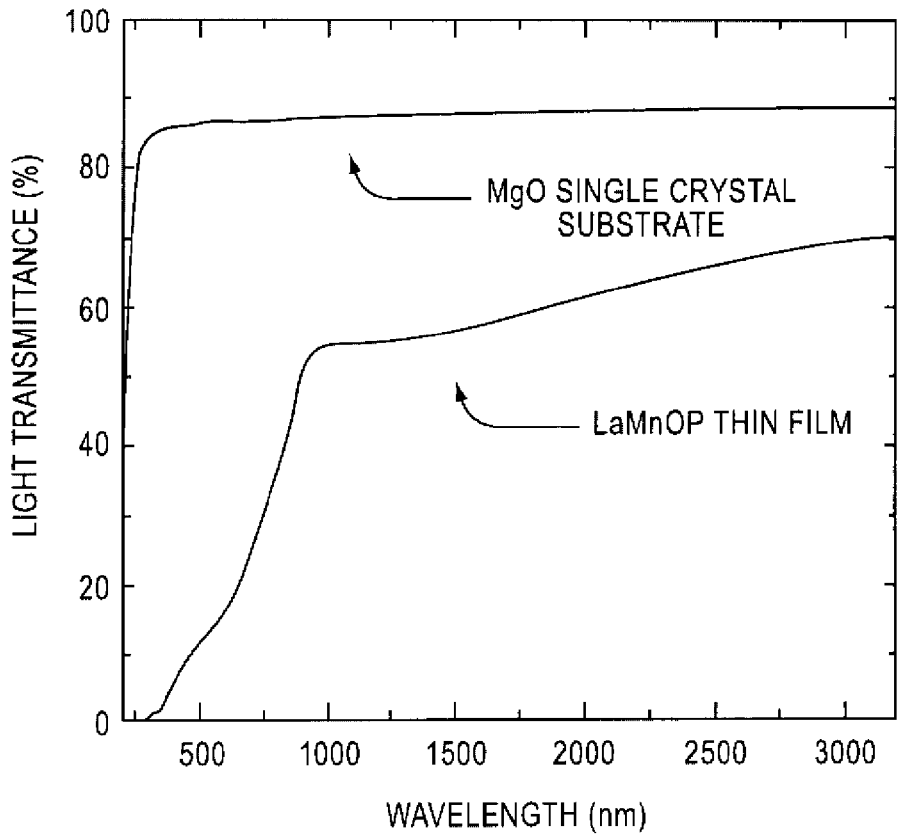
FIG. 9 A graph showing a light-transmission spectrum of a LaMnOP thin film deposited on a MgO substrate obtained in Example 4.

The invention claimed is:

1. A pn homojunction structure of magnetic material, comprising:
   an n-type conductive magnetic semiconductor material represented by
   $LnMnO_{1-x1}Pn_{1-y1}$,
   wherein x1 and y1 satisfy relations: $0<x1<0.1$ and $0<y1<0.1$, and
   a p-type conductive magnetic semiconductor material adjoining the n-type conductive magnetic semiconductor material, the p-type conductive magnetic semiconductor material being represented by
   $LnMnO_{1+x2}Pn_{1+y2}$,
   wherein x2 and y2 satisfy $0<x2<0.1$ and $0<y2<0.1$,
   wherein LnMnOPn is a layered oxy-pnictide compound,
   Ln is at least one type selected from Y and rare earth elements of La, Ce, Pr, Nd, Sm, Eu, Gd, Tb, Dy, Ho, Er, Tm, Yb, and Lu, and
   Pn is at least one selected from pnicogen elements of N, P, As, Bi, and Sb.

2. The pn homojunction structure of magnetic material according to claim 1, wherein the magnetic semiconductor material is included in a magnetic pn homojunction device.

3. The pn homojunction structure of magnetic material according to claim 2, wherein the magnetic pn homojunction device is one device selected from a device for detecting an external magnetic field, a device for detecting electrical current, and a memory device having functions of reading, writing, and retaining information.

4. A pn homojunction structure of magnetic material, comprising:
   a p-type conductive magnetic semiconductor material represented by
   LnMnOPn $Ln^{3+}$ ion site is doped with a divalent metal ion selected from $Mg^{2+}$, $Ca^{2+}$, $Sr^{2+}$, and $Ba^{2+}$, and
   an n-type conductive magnetic semiconductor material adjoining the p-type conductive magnetic semiconductor material, the n-type conductive magnetic semiconductor material being represented by
   LnMnOPn, wherein $Ln^{3+}$ ion site is doped with a tetravalent metal ion selected from $Ti^{4+}$, $Zr^{4+}$, $Hf^{4+}$, $Si^{4+}$, $Ge^{4+}$, $Sn^{4+}$, and $Pb^{4+}$,
   wherein LnMnOPn is a layered oxy-pnictide compound,
   Ln is at least one type selected from Y and rare earth elements of La, Ce, Pr, Nd, Sm, Eu, Gd, Tb, Dy, Ho, Er, Tm, Yb, and Lu, and
   Pn is at least one selected from pnicogen elements of N, P, As, Bi, and Sb.

5. The pn homojunction structure of magnetic material according to claim 4, wherein the magnetic semiconductor material is included in a magnetic pn homojunction device.

* * * * *